May 9, 1944.  A. M. JOSEPHO  2,348,299
POCKET CALCULATING DEVICE
Filed Oct. 20, 1941  6 Sheets-Sheet 1
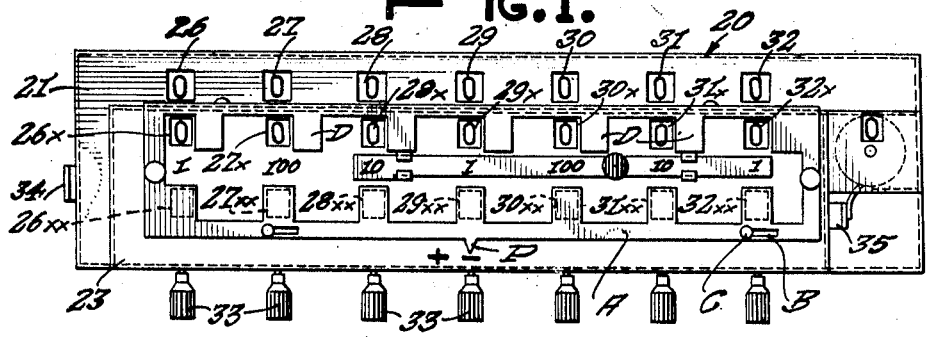
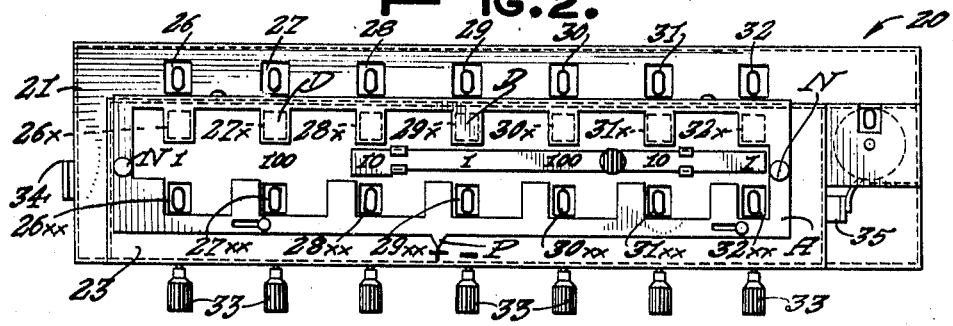
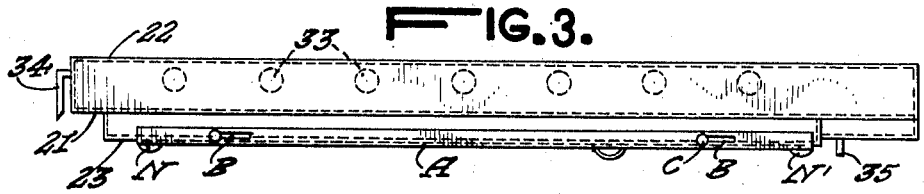
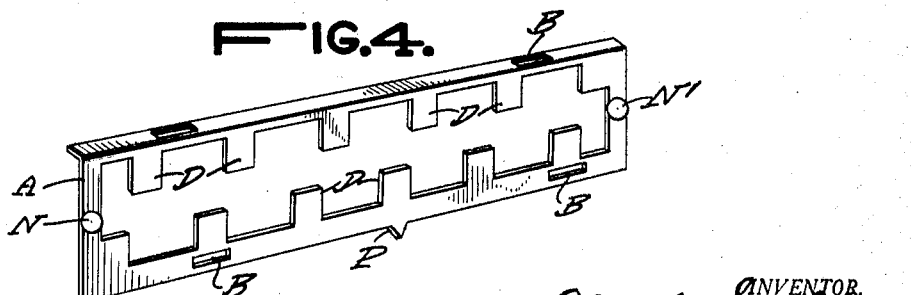

May 9, 1944.  A. M. JOSEPHO  2,348,299
POCKET CALCULATING DEVICE
Filed Oct. 20, 1941  6 Sheets-Sheet 2
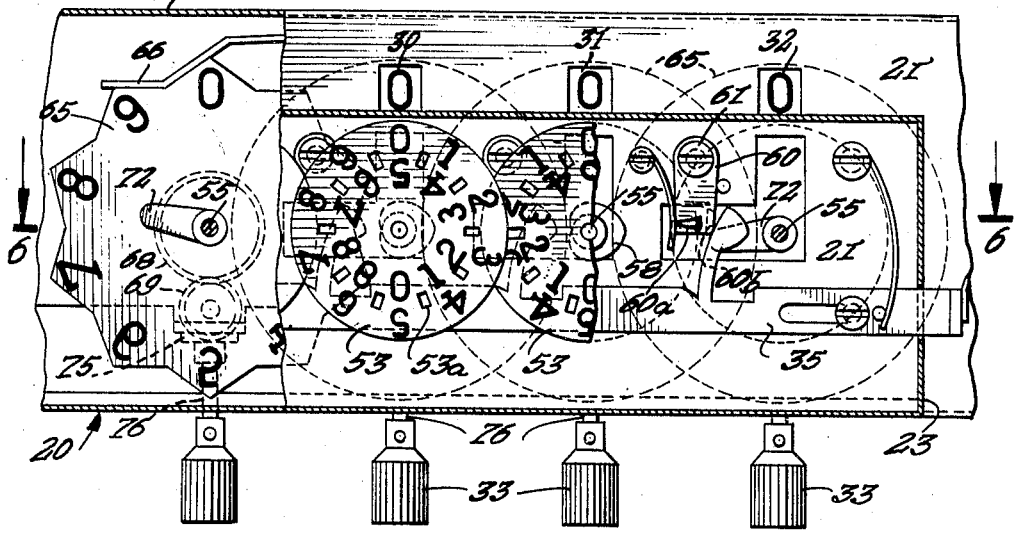
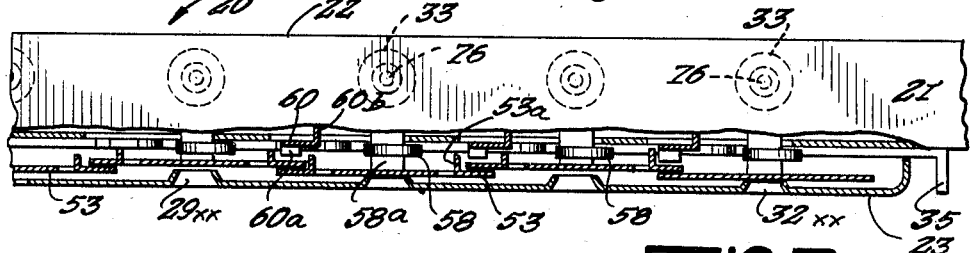
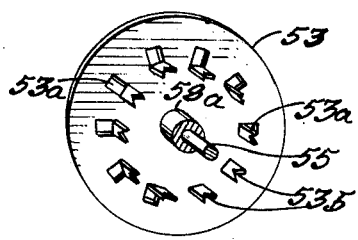
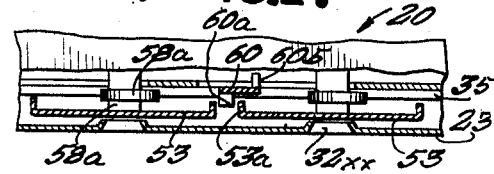

May 9, 1944.　　　A. M. JOSEPHO　　　2,348,299
POCKET CALCULATING DEVICE
Filed Oct. 20, 1941　　　6 Sheets-Sheet 3

INVENTOR.
Aron M. Josepho
BY
H. Lee Helms
ATTORNEY.

May 9, 1944. A. M. JOSEPHO 2,348,299
POCKET CALCULATING DEVICE
Filed Oct. 20, 1941 6 Sheets-Sheet 4

INVENTOR
Aron M. Josepho
BY W. Lee Helms
ATTORNEY.

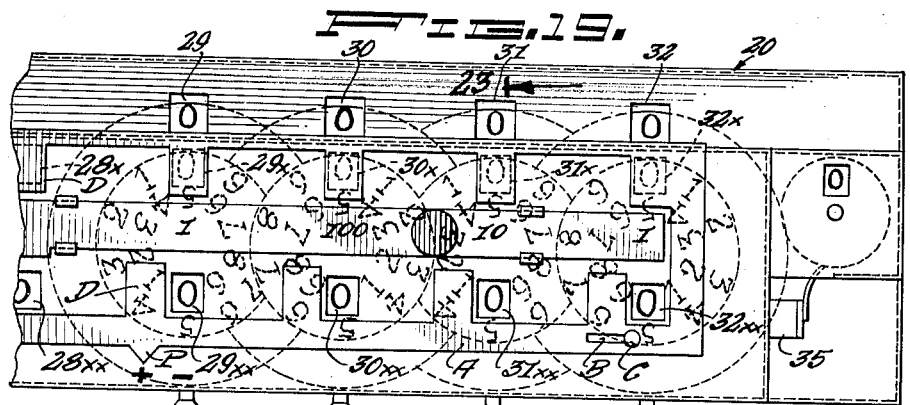
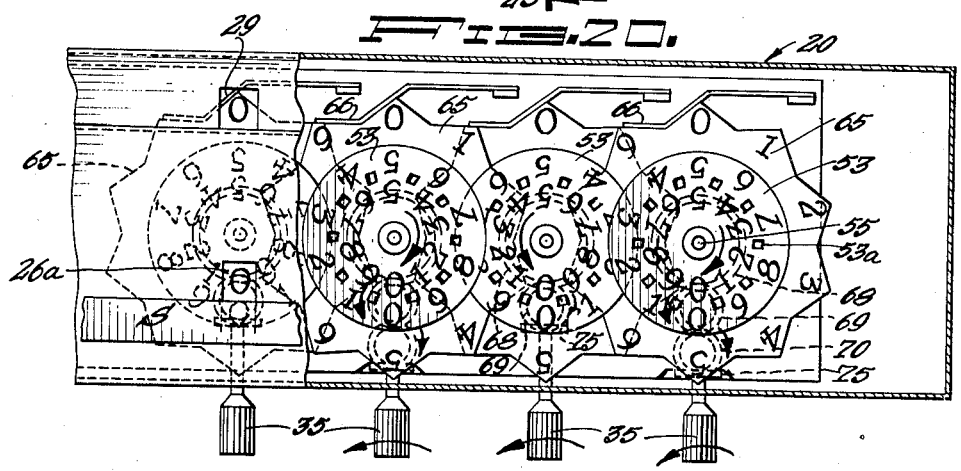
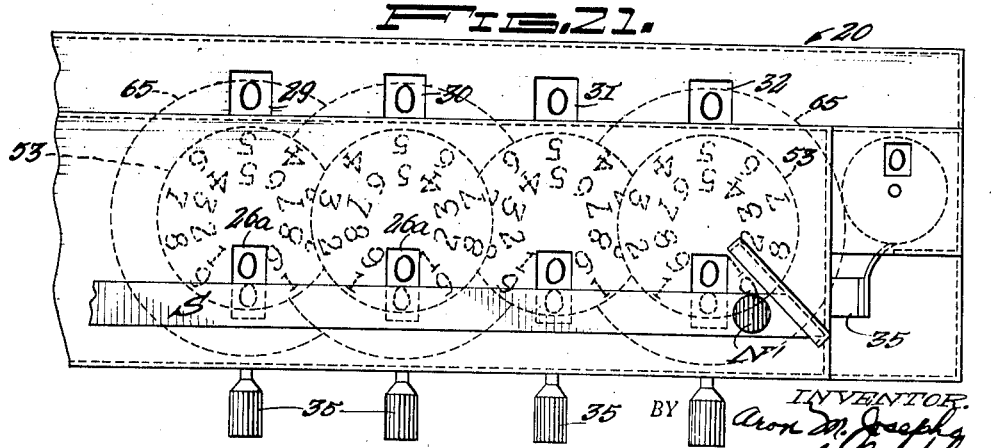

May 9, 1944.  A. M. JOSEPHO  2,348,299
POCKET CALCULATING DEVICE
Filed Oct. 20, 1941   6 Sheets-Sheet 6
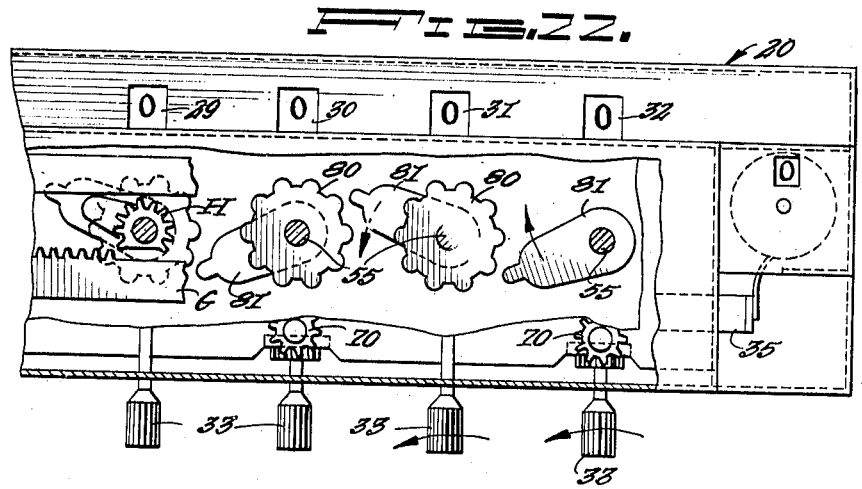
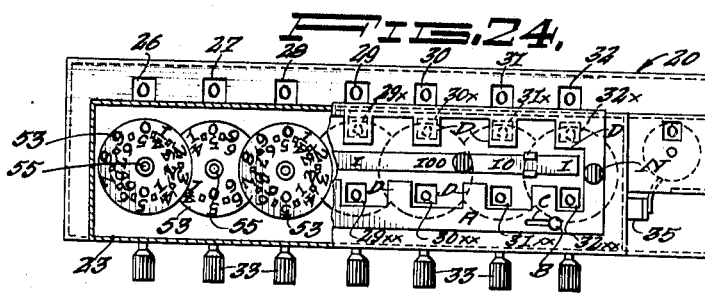
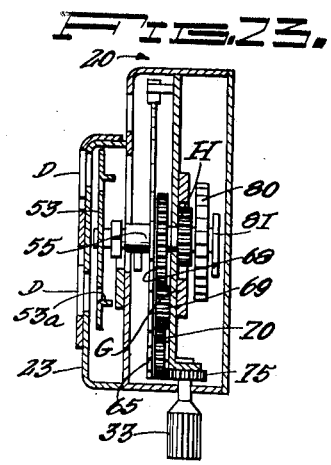
INVENTOR.
Aron M. Josepho
BY
ATTORNEY.

Patented May 9, 1944

2,348,299

UNITED STATES PATENT OFFICE 2,348,299

POCKET CALCULATING DEVICE

Aron M. Josepho, New York, N. Y.

Application October 20, 1941, Serial No. 415,759

4 Claims. (Cl. 235—74)

This invention relates to calculating devices and more particularly to such machines of pocket size type. A major object of this invention is to provide a calculating machine that can be used for calculating in addition, subtraction, multiplication and division. The present application is a continuation in part of my former now abandoned, application, Serial No. 239,797, filed November 10, 1938.

An object of the present application is the use of one single row of indicating dials, instead of a plurality thereof, to indicate the numerals for all four forms of calculations. Therefore, the said single row of dials have two annular arrangements of numerals etched thereon which run from zero to nine. The outside row of every other dial runs in a clockwise direction, and the inside row in a counter-clockwise direction. The numerals on the remaining dials are arranged just the reverse of this.

A further object of this invention is the provision of a shutter upon the cover of the device. This shutter serves to cover the dial numerals that are not used during the calculations.

And further objects of the invention will be seen as the description thereof proceeds:

Fig. 1 is a front elevation of the device showing the apertures for viewing the numerals. It also shows the one form of the shutter bar that is used to cover either the upper or lower row of apertures. In this same figure the apertures of the upper row are shown open while the ones of the lower row are closed or covered.

Fig. 2 illustrates the device shown in Fig. 1, with the shutter bar covering the upper row of apertures, the lower row being left open.

Fig. 3 is a side view of the device shown in Figs. 1 and 2.

Fig. 4 is a perspective view of the shutter showing the extending flaps used to cover the apertures.

Fig. 5 is a horizontal section of the device showing the single row of indicating dials. The numerals etched on the outside circumference of the indicating dials are used for addition and multiplication, and those of the inside row for subtraction and division. The toothed dials are used to indicate the totals of calculations.

Fig. 6 is a partial side section taken on the line 6—6 of Fig. 5, showing the position of the indicating dials within the device. Note that in this case the edges of the dials partially overlap each other.

Fig. 7 is a view showing a modified arrangement for positioning the dials. The dials are arranged in a straight row and do not overlap.

Fig. 8 is a perspective view showing the rear of an indicating dial. It illustrates the position of the prongs which are used to receive a latching finger to latch the dial in place at "ten" transfer operations.

Fig. 9 is a perspective view showing the position of the pivoted latching finger that is used to latch the dials in place. This view also shows a portion of the prong shown in Fig. 8.

Figure 10:
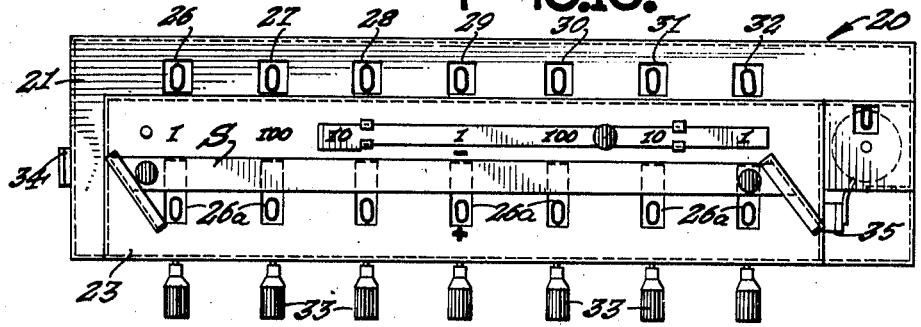

Fig. 10 illustrates a modified arrangement of the shutter bar shown in Fig. 4. In this view the bar is shown in "up" position thus covering the upper portion of the elongated visual opening.

Figure 11:
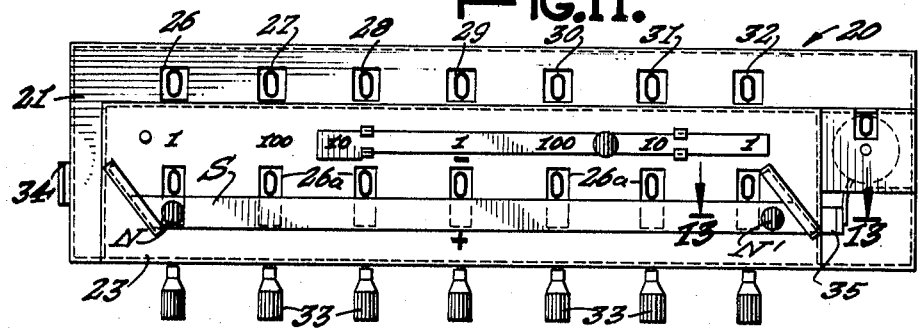

Fig. 11 is similar in character to Fig. 10. It shows the shutter bar in "down" position, disclosing the upper part of the elongated visual opening and covering the lower part thereof.

Figure 12:
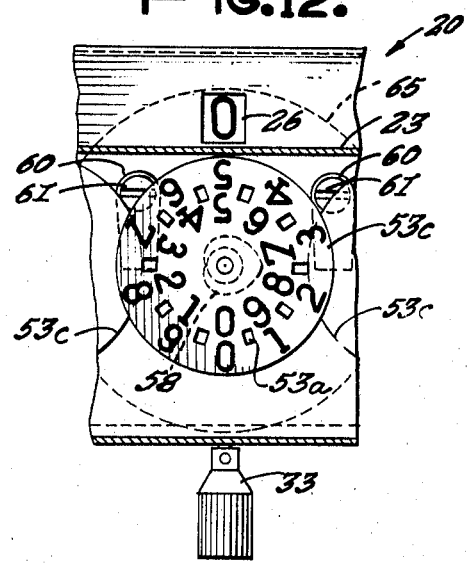

Fig. 12 shows a modified arrangement of an indicating dial with an outside and an inside row of etched numerals. Both rows begin with zero, on the lower part of the dial. In this particular case only one row, instead of two, of elongated apertures is required (see Figs. 10 and 11).

Figure 13:
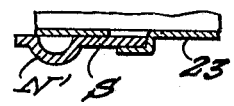

Fig. 13 is a section taken on the line 13—13 of Fig. 11.

Figure 14:
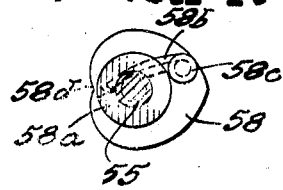

Fig. 14 is a detailed view of the heart-shaped cam used to return the indicating dials to zero position.

Figure 15:
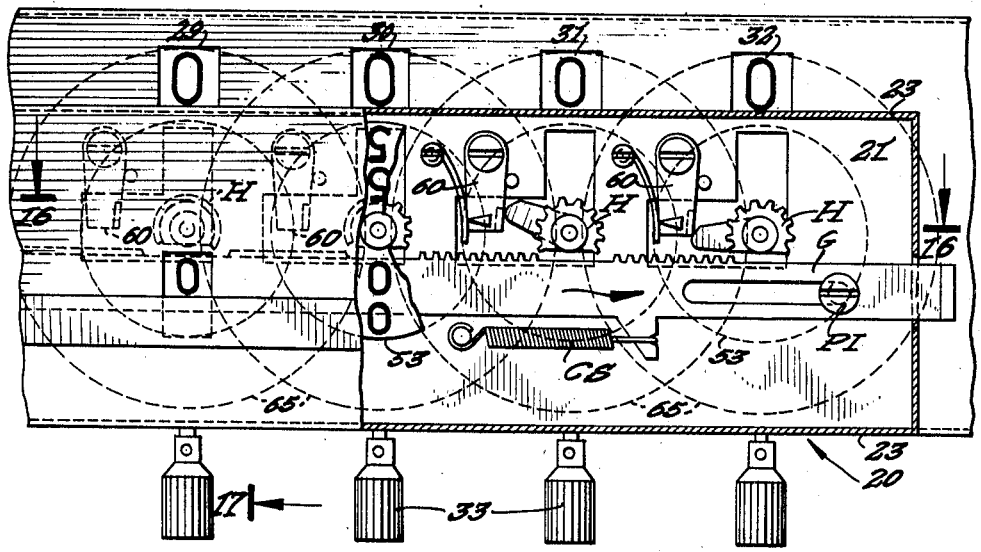

Fig. 15 is a plan section of the device showing a modified arrangement used to reset the numeral indicating dials to zero position.

Figure 16:
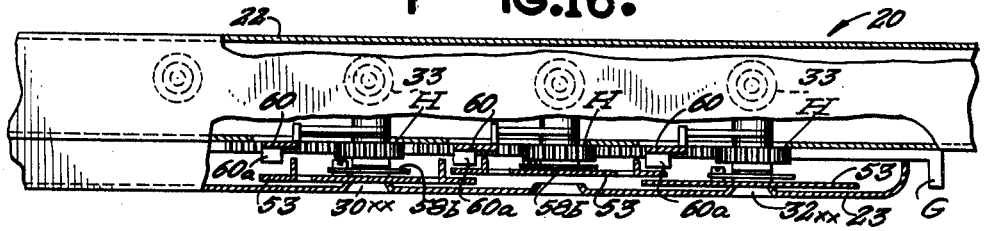

Fig. 16 is a partial side section of the device taken on the line 16—16 of Fig. 15, showing the position of the numeral indicating dials within the device. Note, that in this case, the dials are not reset through the heart-shaped members shown in Fig. 5, but through the medium of cut away gear pinions and a gear rack.

Figure 17:
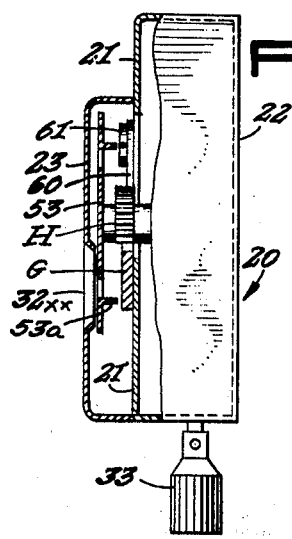

Fig. 17 is a partial sectional view taken on the line 17—17 of Fig. 15.

Figure 18:
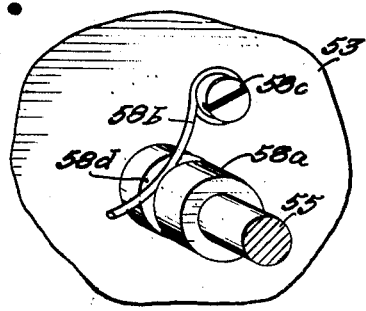

Fig. 18 is a detail of the spring used to effect a tight fitting seat between the indicating dial and the operating shaft.

Fig. 19 is an outside view of the device showing in dotted lines the location of the numerals upon the registering recording dials preliminary to operating the device.

Figure 20 is a section through the device shown in Fig. 11 illustrating the position of numerals upon the registering recording dials.

Fig. 21 is an outside view of Fig. 20 showing in dotted lines the location of the numerals upon the registering recording dials preliminary to operating the device.

Figure 22 is a fragmentary plan view showing the manner a tens transfer is made.

Fig. 23 is a section on the line 23—23 of Fig. 19 showing the train of gears for operating the registering recording dials.

Fig. 24 is a view similar to Fig. 2, but broken away to expose three of the dials which lie under the shutter bar A.

The construction of the present device is as follows:

Referring to Fig. 1, numeral 20 represents the calculating machine proper. A cover 21 is mounted over a base plate 22 and a secondary cover 23 is placed over the first cover 21.

The first cover 21, has one row of visual openings or apertures 26 to 32, while the secondary cover 23 has two rows of visual openings; an upper row 26x to 32x and a lower row 26xx to 32xx inclusive. A set of knobs 33 are used to operate the machine.

A resetting bar 34 is provided to reset to zero the numerals shown through the openings 26 to 32. A secondary resetting bar 35 is used to reset to zero position the numerals shown through the openings 26xx to 32xx and 26x to 32x inclusive. The above mentioned numerals are etched upon indicating dials included within the device and will be described later on.

Within the cover 21, there is a row of totalizer dials 65 with numerals running from zero to nine (0 to 9) that are etched upon them. The latter, are observed through the openings 26 to 32 in the cover 21. A flat tension spring 66 for each dial 65 tends to keep them in place by its springy action upon their toothed outside circumferences. It should be noted that the dials 65 are secured and rotate with shafts 55 which in turn are operated through the medium of a train of gears 68, 69, 75 and the operating shaft 76 that is attached to the knob 33.

Within the secondary cover 23 of the device 20, there is also located a row of indicating dials 53. A heart-shaped member 58 is attached to the rear of each of the dials 53 through the medium of the bushing 58a.

A light spring 58b is attached to the flat side of the heart-shaped member 58, at 58c. The other end of the spring 58b is placed within a slot 58d located upon the connecting bushing 58a and in such a manner that it contacts the shaft 55. This arrangement provides for sufficient frictional fit between the shaft 55, the heart-shaped member and the dial 53 respectively. In short, while the totalizer dials 65 are rigidly attached to their respective shafts 55, the indicating dials 53 are only frictionally attached thereto. This arrangement makes it possible to reset each totalizer dial while each indicating dial is held in place and vice-versa.

The indicating dials 53 have two circumferential rows of numerals. These numbers run from zero to nine (0 to 9). Note that there is one outside row of numerals and another inside row. The numerals of the outside row of every other dial beginning with the right hand one run in a clockwise direction, while, the numerals of the inside row run in an anti-clockwise direction. The numerals of the outside row of each of the intermediate dials run in a counterclockwise direction, while the numerals on the inside row of each of these dials run in the clockwise direction. A set of lugs 53a extend from the back of the dial 53 towards the rear. The ends 53b of the lugs 53a are V-shaped.

A set of hingeably mounted fingers 60, hinged at 61, are attached upon the top of the cover 21 but within the boundaries of the secondary cover 23. The lower ends of the fingers 60 have a V-shaped protrusion 60a. This protrusion is placed automatically within the V-shaped ends 53b of the lugs 53a when the finger 60 is pushed sideways through the rotating motion of the extension fingers 72 which are rigidly attached and rotate with the shafts 55. The extension fingers 72 are clearly illustrated in Fig. 5. The fingers 72 contact the hinging fingers 60 at a side end bend 60b. The latter operation occurs at "ten" transfer. In "ten" transfer operations it is important that the indicating dial 53 is secured fast in place while its respective totalizer dial 65 is turned one tenth of a revolution.

The function of the fingers 60 is to lock the toothed dials 53 which are loosely mounted on the shafts 55 when the totalizer dials 65 which are secured to shafts 55 will rotate from 9 to zero position. This operation is required for the purpose of retaining the toothed dials 53 in their set positions. The fingers 60 are moved by the extension fingers 72 which are secured to the shafts 53.

Referring to the resetting bar 35 it is provided with curved extensions 57, while the dials 53 are conjoined to heart-shaped cams 58. The cams 58 are rotated by a sliding movement of the resetting bar 35 against the tension of the spring 59, the curved extensions 57 of the resetting bar 35 will contact the cams 58 and will rotate said cams and with them the dials 53 respectively, to their original zero position.

To facilitate the operator to differentiate between the numerals used when making addition or subtraction calculation, a shutter bar A is used. The bar A is slideably attached to cover 23 and is made to slide through the medium of slots B and the pins C.

The shutter bar A has two rows of flaps B to cover the visual openings upon the cover 23. These flaps are arranged upon the shutter in a zigzag position and will cover the lower or the upper row of apertures depending on the position of the bar. In Fig. 1 the bar is shown covering the lower openings or apertures 26xx to 32xx while the upper apertures 26x to 32x are left open. In Fig. 2 the opposite is the case; in the latter case the upper openings are covered while the lower openings are left open. A pointer P, located upon the shutter bar A, serves to indicate the proper position of the shutter for plus (+) for addition or minus (—) for subtraction calculations. The bar A is slid by the operator by contacting either one of the knobs N or N'.

Referring to the device shown in Figs. 10 and 11, the shutter bar S instead of being pushed sideways, is slid up or down upon the cover 23. In this particular case, the indicating dial 53c (see Fig. 12) has two circumferential rows of numerals; the latter running from zero to nine (0 to 9). These numbers are etched upon the surface of the dial and in such a manner that the zeros (0) of both rows are located at the lower part of the dial 53c. This arrangement makes it possible the use of one single visual opening 26a to view both rows of numerals upon the dials. While the outside row is used in making addition and multiplication calculations, the inside row is used for making subtraction and division calculations. To prevent the display of the wrong set of numerals, the slideably attached shutter bar S is slid downwards to the plus (+) sign for subtraction and division, and upwards to the minus sign (—), for addition and multiplication calculations.

The object of the shutter bar S is to prevent the use of the wrong set of numerals by the operator.

With reference to the direction of rotation of the discs 65, note that each intermediate disc in the row is rotated in a direction opposite to the direction of rotation of its neighbor although all the knobs 33 are rotated clockwise for addition-operation and anti-clockwise for subtraction-operation. It can be seen from Fig. 5, and more particularly from new Fig. 20, that the centrally located numerals upon each of the intermediate discs 65 progress from zero to nine (0-9) counter-clockwise while the outside numerals progress clockwise. For addition-operation the outside numerals are used and for subtraction-operation the inside numerals. Thus for every intermediate disc 65 the numerals progress in an opposite direction—the inside zero to nine numerals of the first dial to the right (see Fig. 20) in one direction, and the inside numerals of the next dial to the left in opposite direction. Likewise, the outside numerals of the first dial to the right are moved clockwise while the outside numerals of the neighboring disc are moved counter-clockwise. Beginning with the right-hand dial, each odd numbered dial 65 is rotated in one direction by means of a train of gears 68, 69, 70 and 75, and each even numbered dial is rotated in an opposite direction by a train of gears 68, 69 and 75 upon rotating the respective knobs 33 all in the same direction. As each intermediate disc has one more gear in the chain of gears than the adjacent discs, it accounts for the difference of rotation for each one although all the knobs 33 are rotated in the same direction for addition-operation and in the opposite direction for subtraction-operation.

While Fig. 6 illustrates a section taken on the line 6—6 of Fig. 5 and shows the overlapping arrangement of the indicating dials 53 (see also Fig. 5), Fig. 7 shows a different arrangement. In the latter case, the dials 53 are arranged in a straight line. The lugs 53a in this case are not located upon the inner portion of the dial 53 but are to be found upon the marginal circumference of the dial.

Referring to Fig. 15, it illustrates a modified arrangement of the mechanism of the device shown in Fig. 5. In the latter case there have been shown a number of heart-shaped members 58 used to return the dials 53 to zero position. In the case of Fig. 15 the dials are attached to the cutaway pinions H which mesh with the gears of the gear rack G. The gear rack is under the tension of a coil spring CS and slides upon the locating pin PI. The gear rack G is operated in the direction of the arrow when it is desired to reset the dials to zero position.

The spring 58b shown in Fig. 16 is attached upon the rear of the dial 53 instead of to the heart-shaped member 58 shown (see Fig. 18). The spring 58b is utilized to apply pressure upon the operating shaft 55 as to effect a frictional fit between the dial 53 and the shaft 55.

Figure 5 illustrates the manner a tens transfer is made. Each of the shafts 55 has a finger 72 contacting a secondary finger 69. The function of the latter is to lock the toothed dial 53 in position (the dial 53 is loosely mounted upon the neighboring shaft 55). This action will prevent the toothed dial 53 from rotating at the time that the total dial 65 is rotated $\frac{1}{10}$ of a revolution by means of the toothed disc 80 and the toothed finger 81. As each shaft 55 rotates a complete revolution, when the registering recording dial 53 is rotated from zero to nine (0-9), the toothed finger 81 will contact the neighboring toothed disc 80 once in every complete revolution of the shaft 55. It can be seen that each and every one of the shafts 55 has a toothed finger and a toothed disc 80 attached thereto, outside of the first shaft from the right that has only a toothed finger 81 and the last one from the left which has only a toothed disc 80.

*Operation—Addition*

Referring to Fig. 2 which illustrates the manner the calculating machine is used for the purpose of addition, for example, if a number 887 has to be added to the number 475 the knobs 33 are rotated clockwise, starting first with the third knob from the right of the machine until the number can be seen through the visual opening 30xx. Then the second and then the third knobs are rotated in succession until the visual openings 30xx, 31xx and 32xx are registering the number 475.

After the above mentioned operation has been accomplished, the resetting bar 35 is moved to the right by the operator. During the resetting operation the extension arm 57 of the resetting bar 53 will contact the heart-shaped members 58 forcing same to rotate. This action will return the indicating dials 53 to zero position, although the totalizer dials 65 will remain in place showing the number 475 which can be viewed through the visual openings 30, 31 and 32.

The number 887 is then added to the number 475 by operating the knobs 33 again in clockwise direction. First, the third knob from the right of the device until the visual opening 30xx shows the number 8. Then the second and then the first knob is operated in succession until the whole number 887 can be seen through the visual openings 30xx, 31xx and 32xx. As the knobs 33 also rotate the totalizer dials 65, the visual openings 29, 30, 31 and 32 will show the total of both numbers, which sum is 1362.

*Subtraction*

For subtraction operations the shutter A is moved to minus sign (—) until the visual openings 27x to 32x are uncovered (see Figure 1). In case a certain number, for example, 388, has to be subtracted from a number 475, first the number 475 is registered on the dials by turning the knobs 33 in clockwise direction. The third knob from the right is turned first by the operator until a number 4 appears in the visual opening 30x. Then the second and first knobs are operated until the whole number 475 can be seen through the visual openings 30x, 31x and 32x.

The resetting bar 35 is then moved by the operator to the right. This operation will reset the indicating dials 53 to zero position in a similar way described for addition operation.

After the dials had been reset the number 388 is registered by turning the knobs in an anti-clockwise direction. First the third knob from the right is operated until a number 3 appears in the visual opening 30x, then the second and at last the first knob is operated until the entire number 388 can be seen through the openings 30x, 31x and 32x. The final result will be 87 seen through the visual openings 31 and 32 of the totalizer dials 65.

Having described my invention, what I claim and desire to secure by Letters Patent is as follows:

1. In a calculating device including a plurality of numeral indicating dials, rotary shafts upon which said dials are frictionally mounted, totalizer dials rigidly attached to said shafts, tens transfer for the totalizer dials and separate re-setting means for each of said dials for resetting said dials to zero position independently of each other.

2. In a calculating device, a plurality of dual numeral indicating dials set one in front of the other and a plurality of rotary shafts upon which said dials are mounted, each shaft carrying two of said dials, a front dial being frictionally mounted upon said shaft and a rear dial being rigidly attached to said shaft, tens transfer means for said rear dials, and separate re-setting means for re-setting to zero said dials independently of each other.

3. In a calculating device, a plurality of numeral indicating dials, said dials having two annular rows of numerals thereon, one of said rows running circumferentially upon the surface of said dial and in a clockwise direction, a plurality of shafts upon which said dials are frictionally mounted, means for rotating said shafts clockwise or counterclockwise, and means for re-setting said dials to zero position independently of the shafts and rotating means.

4. In a calculating device including numeral indicating dials, shafts upon which said dials are frictionally mounted, said indicating dials having dual circumferential rows of numerals thereon, one row running clockwise, the other anticlockwise and means for rotating said shafts and dials, secondary dials also included and rigidly attached to said shafts, and separate means for re-setting to zero the secondary dials independently of the shafts and operating means.

ARON M. JOSEPHO.